United States Patent [19]

Weisend, Jr. et al.

[11] Patent Number: 5,112,011
[45] Date of Patent: May 12, 1992

[54] PNEUMATIC DEICER FOR SHEDDING THIN ICE

[75] Inventors: Norbert A. Weisend, Jr.; Bernard F. Trares, both of Cuyahoga Falls; Kevin L. Leffel, Akron, all of Ohio

[73] Assignee: The B. F. Goodrich Company, Akron, Ohio

[21] Appl. No.: 445,232

[22] Filed: Dec. 4, 1989

[51] Int. Cl.$^5$ .............................................. B64D 15/18
[52] U.S. Cl. .................................................. 244/134 A
[58] Field of Search ............ 244/134 R, 134 A, 134 B

[56] References Cited

U.S. PATENT DOCUMENTS

| 2,957,662 | 2/1956 | Hess. |
| 3,370,814 | 2/1968 | Kageorge et al. |
| 3,690,601 | 9/1972 | Roemke. |
| 4,516,745 | 5/1985 | Ely. |
| 4,561,613 | 12/1985 | Weisend ........................ 244/134 A |
| 4,836,474 | 6/1989 | Briscoe et al. .................. 244/134 A |

OTHER PUBLICATIONS

Dwight L. Loughborough, Howard E. Greene, Paul A. Roush, "A Study of Wing De-Icer Performance on Mount Washington", Sep. 1948, vol. 7, No. 9.

Primary Examiner—Galen Barefoot
Attorney, Agent, or Firm—David M. Ronyak

[57] ABSTRACT

An inflatable deicer having deicing tubes formed by adjacent rows of stitching between inner and outer plies with a manifold tube intersecting and extending across the deicing tubes. The stitching of the deicing tubes is turned at the edges of the manifold to reinforce the edges of the manifold tube. The deicing tubes are narrow and the inflation pressure is high for a short activation time at relatively long intervals to shed thin ice.

10 Claims, 3 Drawing Sheets

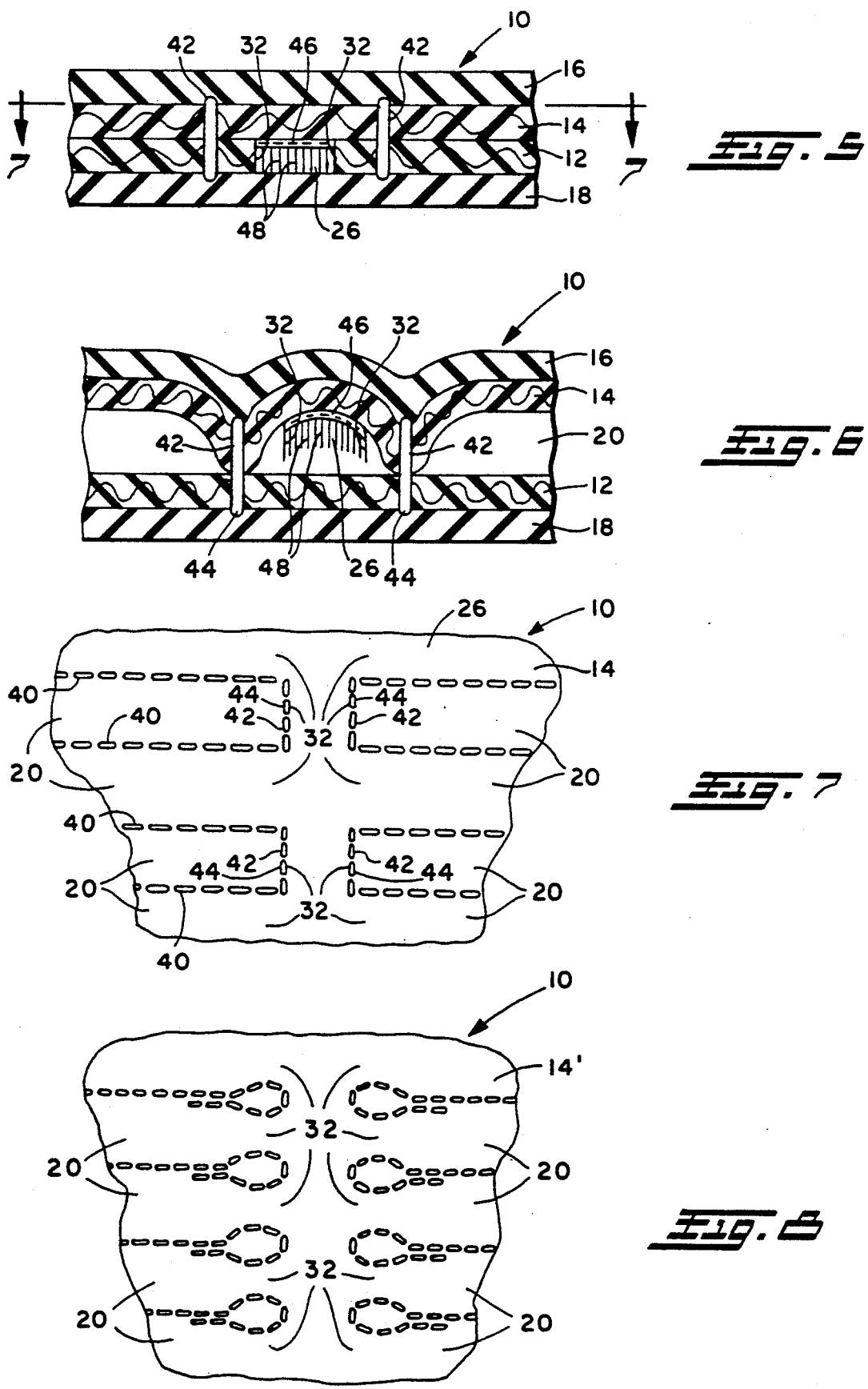

PNEUMATIC DEICER FOR SHEDDING THIN ICE

BACKGROUND OF THE INVENTION

This invention relates to an inflatable deicer having deicing tubes and a manifold tube for attaching to an aircraft to break up thin ice accumulations. One of the problems with deicers used heretofore has been the difficulty in shedding small particles of ice in those locations where large ice particles may cause impact damage to turbine engines, prop fans, propellers and other critical flight elements. There has also been a problem in providing adequate airflow for inflation and deflation especially when deicing tubes are inflated to high pressures. Separate manifold tubes have had flow-restricting, interconnecting holes between the manifold and the deicing tubes. Also recesses in the aircraft surface have been necessary to accommodate the manifold tubes so as to maintain the smooth outer contour of the aircraft surface. This has increased the cost of installation of the deicers.

Narrow width deicing tubes have been tested for removing thick ice particles with relatively low air pressures. It has also been proposed to remove thin ice particles by using a deicer with an outer skin of elevated modulus of elasticity and deflecting the outer skin for short periods of time.

SUMMARY OF THE INVENTION

The present invention provides a deicer with a manifold which is built in and has the same deflated thickness as the deicing tubes for providing a smooth, aerodynamic surface. The tubes are narrow to provide a short radius for the inflated tube to increase the ice fracturing stresses produced by the inflation of the tubes. The deicing tubes are defined by adjacent rows of stitches between the inner and outer plies extending to the edges of the manifold where the stitching is turned and continuous to reinforce the deicer at the manifold edges. This is important in view of the high pressure of the fluid necessary to inflate the narrow tubes and cause fracturing of the thin ice particles. For example, the effective shedding of thin ice having a thickness of about 0.03 inches (0.076 cm) is accomplished by inflating the deicing tubes to a relatively high fluid pressure of about 125 psi (8.79 kg/cm$^2$) for a short activation time of about one-quarter second at substantially longer intervals of ten to fifteen seconds.

The above and other features and advantages of the instant invention will become more apparent when viewed in light of the description of the best embodiments of the invention and the drawings which follow, together forming a part of the specification:

DESCRIPTION OF THE DRAWINGS

FIG. 5 is an enlarged fragmentary sectional view taken along the line 5—5 of FIG. 1 showing the manifold tube between the ends of one of the deicing tubes with the deicer in the deflated condition.

FIG. 6 is a view like FIG. 5 with the deicer in the inflated condition.

FIG. 7 is a fragmentary schematic view taken along the line 7—7 in FIG. 5 showing the continuous stitching at the edges of the manifold tube for the embodiment shown in FIGS. 1 through 6.

FIG. 8 is a view like FIG. 7 showing an alternate looped continuous stitching at the edges of the manifold tube.

DETAILED DESCRIPTION

Figure 1:
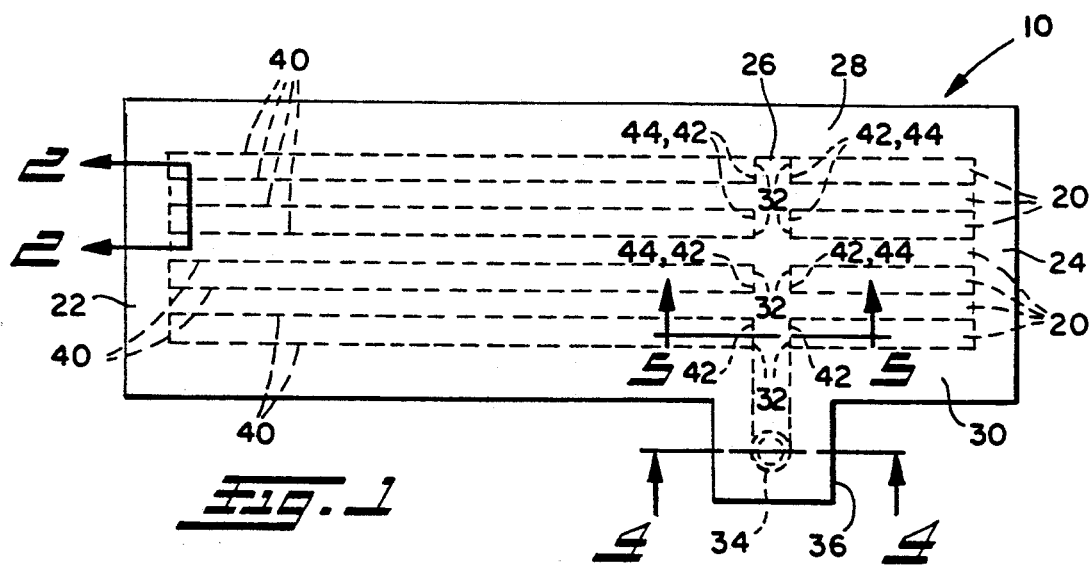
FIG. 1 is a plan view of a deicer embodying the invention with the position of the inflatable passages and stitching being shown in dotted lines.
Figure 2:
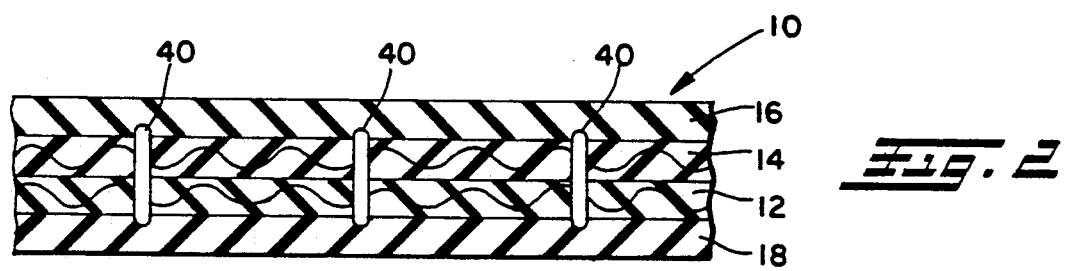
FIG. 2 is an enlarged fragmentary sectional view taken along line 2—2 of FIG. 1.

A laminated, inflatable deicer 10 is shown in FIG. 1 prior to installation on an aircraft surface. As shown in FIGS. 2 and 5, the deicer 10 has an inner ply 12 and an outer ply 14 which may be of fabric coated with rubber or other resilient rubberlike material. The outer ply may be covered by an outer sheet member 16 and the inner ply 12 may be covered by an inner sheet member 18, both of which may be of resilient rubberlike material such as neoprene.

As shown in FIG. 1, the deicer 10 has a plurality of passages forming deicing tubes 20 extending across the deicer from one edge 22 to an opposite edge 24.

A manifold tube 26 extends across the deicing tubes 20 from one side 28 of the deicer 10 to an opposite side 30. The deicing tubes 20 have intersecting ends 32 at the edges of the manifold tube 26.

An air connection 34 is provided in deicer extension 36 extending outwardly from the side 30 of the deicer 10. The manifold tube 26 extends into the deicer extension 36 and is in communication with a valve stem 38 extending from the inner ply 12 and inner sheet member 18 as shown in FIG. 4.

The deicing tubes 20 include a plurality of passages formed by adjacent rows 40 of stitching between the inner ply 12 and outer ply 14 as shown in FIGS. 1 and 2. The rows of stitching 40 include a series of stitches having a minimum frequency of penetration through the deicer 10 forming a relatively open stitching pattern to permit the flow of air between the deicing tubes 20. As shown in FIGS. 1 and 7, the rows of stitching 40 are continuous and each of the rows is connected to an adjacent one of the rows by a connecting row of stitching 42. By turning the rows of stitching 40 at the intersecting ends 32 of the deicing tubes 20 and continuing the rows through the connecting rows 42 to an adjacent one of the rows of stitching where they are continued to a position spaced from the intersecting ends a reinforced edge 44 the manifold tube 26 is provided.

Figure 4:
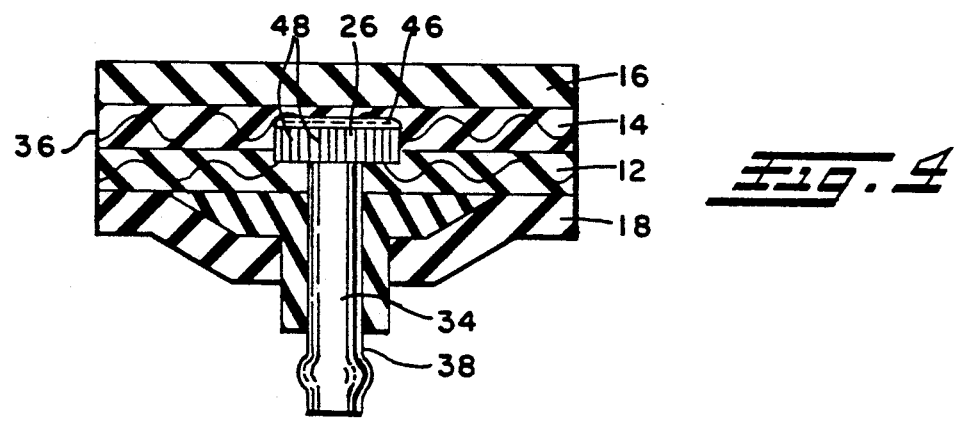
FIG. 4 is an enlarged section taken along line 4—4 of FIG. 1 showing the air connection to the manifold tube.

As shown in FIGS. 4, 5 and 6, a bleeder material such as a fabric strip 46 having a plurality of closely spaced elements such as stiff fibers 48 may be positioned between the inner ply 12 and outer ply 14 in the manifold tube 26 to maintain the tube in an open condition.

Preferably, the rows of stitching 40 are relatively close together and spaced apart from about 0.25 to 0.50 inches (0.64 to 1.27 cm) to provide deicing tubes having a high ice fracture stress factor for shedding thin layers of ice. The manifold tube 26 is preferably connected to a source of fluid pressure such as an air pump providing air pressure from about 75 to 125 psi (4.39 to 8.79 kg/cm$^2$). A timer connected to a deicer valve provides an activation time of about one-tenth to one-half second at intervals of about ten to fifteen seconds whereby ice having a thickness of from about 0.02 to 0.04 inches (0.51 to 1.02 cm) may be broken away in operation. In order to improve the inflation rate it may be desireable to include air augmentation such as a pulse tank or accumulator located adjacent to and upstream of the deicer valve.

Figure 3:
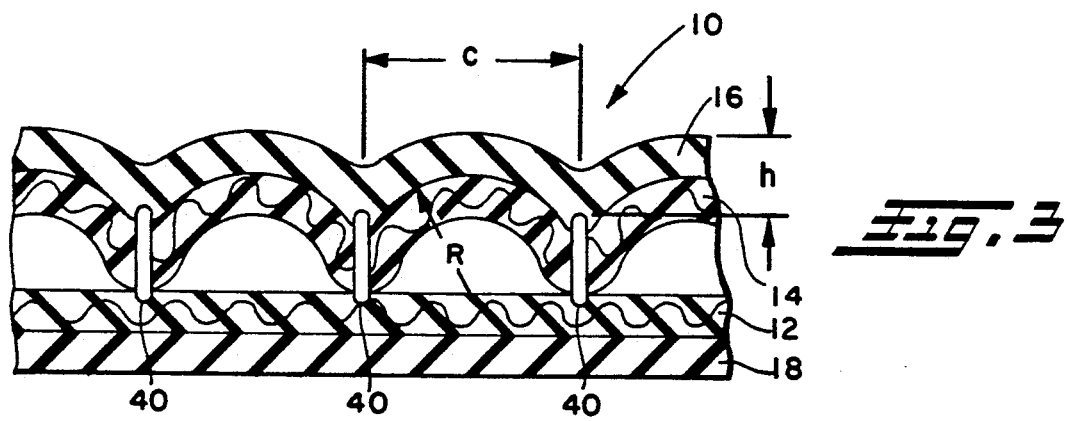
FIG. 3 is a view like FIG. 2 with the deicer in the inflated condition.
Figure 9:
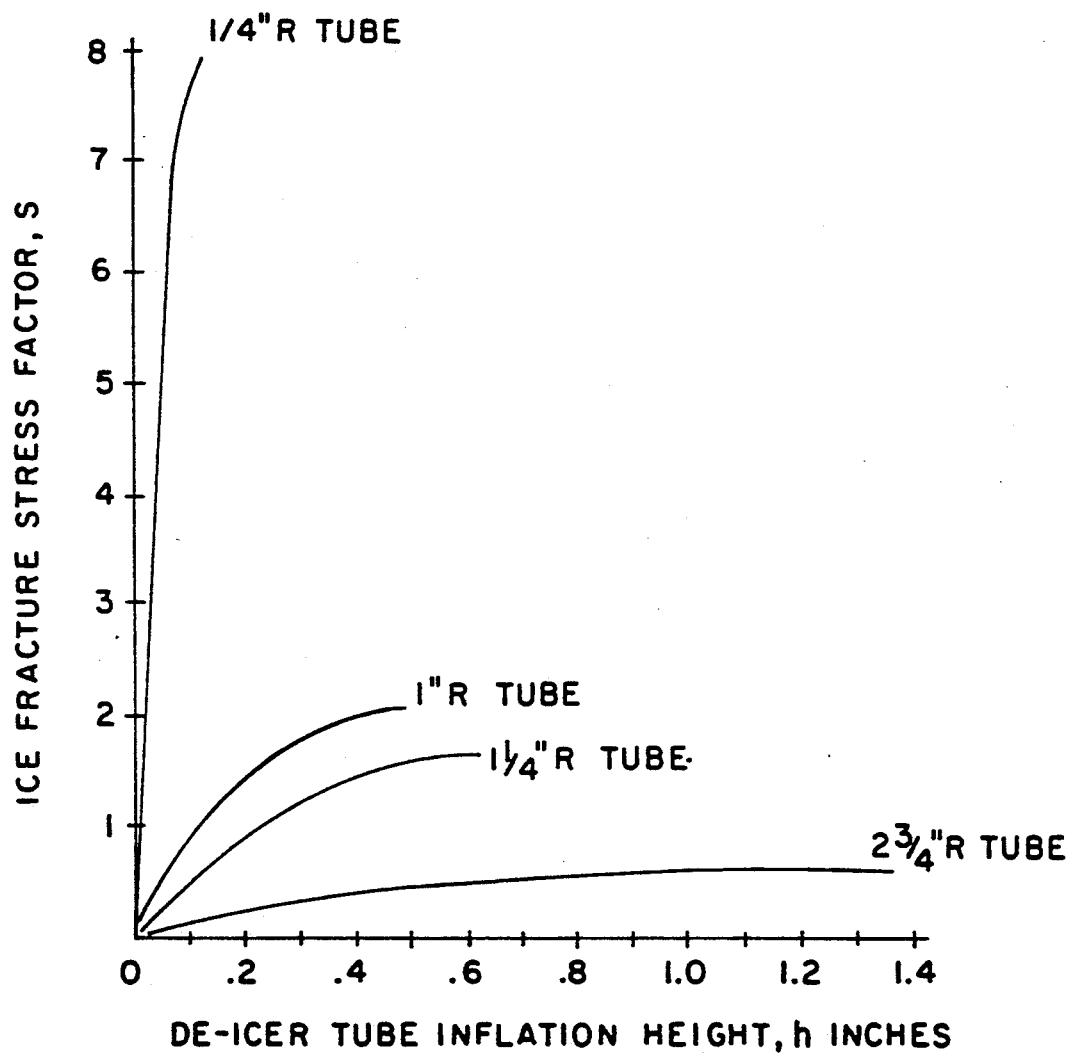
FIG. 9 is a graph showing the ice fracture stress factor curves for different width deicer tubes.

Referring to FIGS. 3 and 6, the deicer 10 is shown in the inflated condition with the deicer tubes 20 expanded and providing an inflated contour with a relatively small radius (R) to provide high ice fracture stress factors as shown in FIG. 9.

Referring to FIG. 3, the inflated contour of one of the deicing tubes 20 is approximately a circular segment having a tube width C, a tube inflation height, h and an inflated tube radius R. The ice bending or fracturing stress factor S is inversely proportional to the inflated tube radius R and may be calculated by multiplying a stress coefficient K times 8 h divided by the sum of $C^2$ plus $4h^2$ where K can represent all ice fracturing stress coefficients except radius R. FIG. 9 illustrates ice fracturing stress factors S for different size deicing tubes 20 as a function of their inflation height h. It can be seen that the smaller deicing tubes 20 with a radius R of 0.25 inch (0.64 cm) can produce substantially higher ice fracturing stress factors S than the larger deicing tubes with larger radii R of 1.0, 1.25 and 2.75 inches (2.54, 3.18 and 7 and 7 cm).

In addition to the smaller deicing tubes 20 providing greater fracturing stress factors S than the larger deicing tubes, the inflation profiles of the smaller deicing tubes cause substantially lower drag than the inflation profiles of the larger deicing tubes. It is also possible to operate the smaller deicing tubes 20 for a shorter inflation time of about 0.5 seconds as compared with inflation times of about 6 seconds for the larger deicing tubes. The intervals between inflation of the smaller deicing tubes may be from 10 to 15 seconds to remove ice having a thickness of from about 0.02 to 0.04 inches (0.51 to 1.02 cm) and therefore the total inflation drag is substantially less than with larger deicing tubes.

In a typical installation the flat surface of the inner sheet member 18 is adhered to the flat surface of an aircraft by a suitable adhesive of which many different kinds are well known in the art. With the deicer 10 of this invention having the same thickness throughout, the deicer can be mounted in a recess having the same depth as the deicer thickness and thereby reduce the aerodynamic drag. The manifold tube 26 is maintained in an open condition by the stiff fibers 48 of the fabric strip facilitating rapid inflation and deflation of the deicing tubes 20.

With the foregoing disclosure in mind, many varied and obvious modifications of the invention will become readily apparent to those of ordinary skill in the art.

We claim:

1. An inflatable deicer for mounting on an aircraft comprising an inner ply, an outer ply, of fabric coated with resilient rubber-like material covered by an outer sheet member of resilient rubber-like material, a plurality of passages forming deicing tubes, a manifold tube extending across said deicing tubes intersecting ends of at least some of said passages for communicating high pressure fluid to said passages, said passages being defined by adjacent rows of stitching between said inner ply and said outer ply, said stitching being turned at said intersecting ends of said passages and continued to a position spaced from said intersecting ends providing a reinforced edge of said manifold tube, said adjacent rows of stitching being spaced apart from about 0.25 to 0.50 inches (0.64 to 1.27 cm.), said manifold tube being connected to a source of fluid pressure providing air pressure of from about 75 to 125 psi (4.39 to 8.79 kg/cm$^2$) for an activation time of from about one-tenth to one-half second at intervals of about ten to fifteen seconds to shed ice having a thickness of from about 0.02 to 0.04 inches (0.51 to 1.02 cm).

2. The apparatus of claim 1 wherein said stitching includes a series of stitches sewing together said inner ply and said outer ply, said stitches having a minimum frequency of penetration through said deicer so that said stitches form a relatively open stitching pattern to permit the flow of air between said passages.

3. The apparatus of claim 2 wherein said stitches are continuous and connect said adjacent rows of said stitching at said intersecting ends of said passages.

4. The apparatus of claim 2 wherein said stitches are continuous and looped at each of said ends of said passages.

5. The apparatus of claim 1 wherein said intersecting ends of said passages are located on both sides of said manifold tube.

6. The apparatus of claim 5 wherein said manifold tube contains a bleeder material positioned between said inner ply and said outer ply to maintain the open condition of said manifold tube.

7. The apparatus of claim 5 wherein the thickness of said deicer at said manifold tube in the deflated condition is substantially the same as the thickness of said deicer at said deicing tubes in the deflated condition.

8. The apparatus of claim 1 wherein said outer ply and said inner ply are coated fabric layers.

9. A method of deicing an inflatable deicer having narrow deicing tubes formed of fabric coated with resilient rubber-like material and covered by an outer sheet member of resilient rubber-like material, the deicing tubes having a width of about 0.25 to 0.50 inch (0.64 to 1.27 cm) and a manifold tube intersecting and extending across said deicing tubes comprising the steps of:
   (a) communicating fluid under pressure of from about 75 to 125 psi (4.39 to 8.79 kg/cm$^2$) to said manifold to inflate said deicing tubes;
   (b) maintaining said inflation for an activation time of from about one-tenth to one-half second;
   (c) deflating said deicing tubes for intervals of longer duration than said activation time; and
   (d) reinflating said deicing tubes to shed ice having a thickness of from about 0.02 to 0.04 inches (0.51 to 1.02 cm).

10. The method of claim 9, wherein said intervals of deflation are from about ten to fifteen seconds for shedding ice of from about 0.02 to 0.04 inches (0.51 to 1.02 cm).

* * * * *